June 8, 1954　　　W. J. McHUGH ET AL　　　2,680,315
TAG HOLDER
Filed July 26, 1950

INVENTOR.
William J. McHugh
BY Alexander J. McHugh
William B. Jaspert
Attorney

Patented June 8, 1954

2,680,315

UNITED STATES PATENT OFFICE 2,680,315

TAG HOLDER

William J. McHugh and Alexander J. McHugh,
Export, Pa.

Application July 26, 1950, Serial No. 175,968

1 Claim. (Cl. 40—17)

This invention relates to new and useful improvements in tag holders, more particularly to tag holders for dog collars, and it is among the objects thereof to provide tag holders in which the tag or license plates may be inserted without riveting or otherwise attaching the same to the collar.

The invention will become more apparent from a consideration of the accompanying drawing, constituting a part hereof, in which like reference characters designate like parts, and in which.

Figure 1:
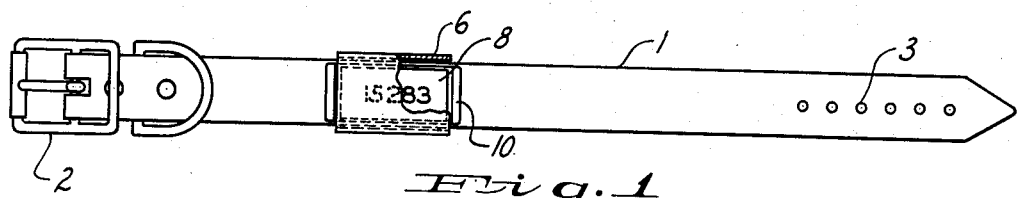
Fig. 1 is a top plan view, partially in cross-section, of a dog collar and tag holder embodying the principles of this invention.
Figure 2:
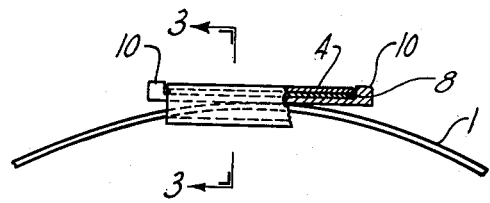
Fig. 2 is a side elevational view of a portion of a collar with the tag holder partially cut away.
Figure 3:
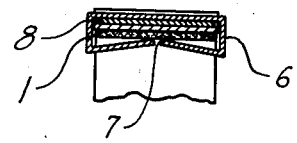
Figure 4:
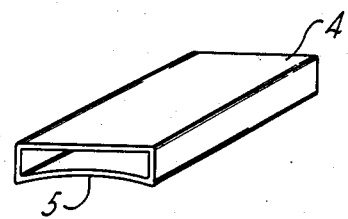
Figure 5:
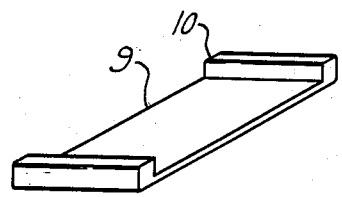
Figure 6:
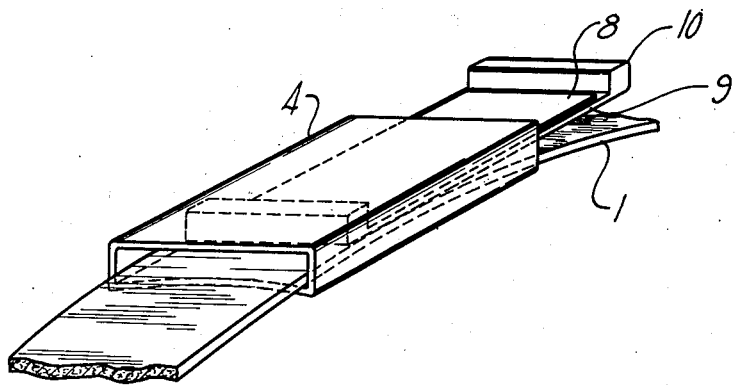

Fig. 3 a cross-sectional view taken along the line 3—3, Fig. 2;

Fig. 4 a view in perspective of the tag holder housing;

Fig. 5 a similar view of the retaining slide for use with the housing of Fig. 4; and Fig. 6 a view in perspective of a portion of the collar with the housing and slide partially assembled for purpose of illustration.

With reference to the several figures of the drawing, numeral 1 designates a strap or collar having a buckle 2 and perforations 3 by which it may be attached. Mounted on the collar is a sheath which may be in the form shown in Fig. 3 or as shown in Fig. 4. It consists of a hollow rectangular member, preferably of transparent material such as plastic, and is designated by the numeral 4, Fig. 4, with the bottom wall 5 concave for a purpose hereinafter explained. In the form shown in Fig. 3 the housing 6 is open at the ends 7 and is molded to the shape shown with the bottom portion indented for effecting intimate contact with the belt 1. The tag or license plate to be mounted in the holder is designated by the numeral 8 and is inserted in the slide 9 having lugs 10.

Whether in the form shown in Figs 3 or 4, the sheath is slipped over the end of the strap or collar 1. The tag or license plate 8, which is usually of brass or other metal, is placed in the slide 9 as shown in Fig. 6, and the slide is then pushed into the sheath 4 until the lugs 10 have cleared the edges of the sheath as shown in Fig. 2. By means of the indented ends 7 of the sheath 6 or the concave wall 5 of the sheath 4, the slide 9 will snap into the position shown in Fig. 2 with the lugs 10 enveloping the edges of the sheath to prevent displacement of the slide once it is assembled. The pressure of the indents of the sheath 6 or the concave wall 5 of the sheath 4 against the belt 1 effects a resilient gripping action between the sheath and the slide to firmly secure the tag or license plate 8 therebetween. By virtue of the end lugs 10 of the slide, the latter cannot be displaced no matter how severely the holder may be subjected to strain when used for dog collar tag holders. The tag holder, once mounted on the collar or strap, may be slid thereon to adjust its position where desired relative to the buckle end of the collar. As is apparent, since neither the sheath nor slide are riveted to the collar, it is a simple matter to attach the tag holder without tools and without mutilating the collar, as is required where the tags are riveted on the collar.

While the invention has been disclosed as applicable for use as a license plate holder for dog collars, it evidently may be employed for identification tags on luggage, or other uses.

Although several embodiments of the invention have been herein illustrated and described, it will be evident to those skilled in the art that various modifications may be made in the details of construction without departing from the principles herein set forth.

We claim:

A license or tag holder for mounting on straps or the like comprising a rectangular sheath for passing over a strap, said sheath having a wall of transparent material and having the opposite wall indented inwardly to grippingly engage the strap, and a slide for said sheath comprising a U-shaped member for receiving the tag, the legs of the U-shaped member being spaced a distance greater than the length of the sheath to interlock with the ends of the sheath when assembled between the strap and transparent wall of the sheath and said legs being of a height corresponding to the spacing between the walls of the sheath to pass through said sheath to interlock with the ends of the sheath when the strap is inserted below the U-shaped member.

References Cited in the file of this patent

UNITED STATES PATENTS

| Number | Name | Date |
|---|---|---|
| 1,368,144 | Haughwout | Feb. 8, 1921 |
| 1,539,744 | Kelly | May 26, 1925 |
| 2,124,025 | Braun | July 19, 1938 |
| 2,535,265 | Caffrey | Dec. 26, 1950 |

FOREIGN PATENTS

| Number | Country | Date |
|---|---|---|
| 3,572 | Sweden | May 11, 1892 |